UNITED STATES PATENT OFFICE.

JOHN ANDERS REINHOLD NILSSON AND SVEN ADOLF HELLQVIST, OF BJÖRKETORP, SWEDEN.

PROCESS OF EXTRACTING MILK-SUGAR FROM WHEY.

938,017. Specification of Letters Patent. Patented Oct. 26, 1909.

No Drawing. Application filed April 28, 1909. Serial No. 492,697.

*To all whom it may concern:*

Be it known that we, JOHN ANDERS REINHOLD NILSSON and SVEN ADOLF HELLQVIST, subjects of the King of Sweden, and residents of Björketorp, Sweden, have invented a new and useful Improved Process of Extracting Milk-Sugar from Whey, of which the following is a specification.

This invention relates to an improved process of extracting milk-sugar from whey.

In the process heretofore most generally used for extracting milk-sugar from whey the latter—with or without a foregoing precipitation of the albuminous substances—is first concentrated to rough sugar, then the rough sugar, which is contaminated with fat, albumen and so on, is dissolved in water to a specific gravity of 1.11. The solution thus obtained is thereupon refined in any well known manner used in refining sugar, filtrated and concentrated until crystallization commences whereupon the refined sugar is separated by means of a centrifugal apparatus. In said process a very essential part of the milk-sugar remains in the mother-liquor in separating the rough sugar and another part of the milk-sugar is lost with the refined sugar solution which cannot be fully utilized. In treating whey with a percentage of sugar of 4.6–4.7 it has heretofore been possible to obtain a result of at most 2.5 percentage as pure refined sugar while the remainder has been lost.

The chief object of the present invention is to reduce the losses of sugar due to an incomplete extraction of sugar from the concentrated whey and thereby to make the process more economical than heretofore.

The invention consists in first separating from the whey the greater part of the albuminous substances by precipitation and filtration in well known manner, concentrating the whey to a specific gravity of 1.11 or the concentration generally used in refining rough sugar, refining the solution by precipitating the remainder of the albuminous and other precipitable substances, filtering the solution and concentrating the same until crystallization commences, and finally separating the refined sugar in well known way by means of a centrifugal apparatus.

Example: From a quantity of whey of 3280 liters and of a specific gravity of 1.028 and a percentage of sugar of 4.6 the greater part of the albumen was precipitated, whereupon the whey was filtered and concentrated to a specific gravity of 1.11 and the solution obtained was refined, filtered and concentrated until crystallization commenced, whereupon it was left to cool and finally subjected to a separation process in a centrifugal apparatus. The following products were obtained:

113 kg. refined sugar with a
  percentage of water of 14_   97.18 kg. sugar
170 liters refined sugar solution containing 15.1 gr.
  sugar pro 100 cm²_____   25.67 kg. sugar Total _____ 122.85 kg. sugar However of the sugar contained in the refined sugar solution only about 50% can be gained, so that the real result in the example given above was 97.18+12.835=110.015 kg. This result corresponds to 3.26% and the loss to 1.34% and is thus very good. The usual average result as stated by Herzfeld is 2.5% in treating whey with a percentage of sugar of 4.7. In concentrating whey with said percentage of sugar according to the present invention the process can be calculated to leave a result of at least 3.3% or an increase of 0.83% compared with the result obtained in the old methods.

The amount of labor necessary in carrying out this process is about the same as that necessary in the processes heretofore used. The labor saved in carrying out the centrifugal part of the process involved in this invention is about equivalent to the increased labor necessitated in the filtration, but, inasmuch as the vaporization of the water otherwise used for dissolving the rough sugar is obviated, about 15% of fuel is spared.

Having now described our invention what we claim as new and desire to secure by Letters Patent is:

The process of extracting milk-sugar from whey, which consists after separating the greater part of the albuminous substances by precipitation and filtration, in concentrating the whey to a specific gravity of about 1.11, again precipitating, and filtering the solution for removing the remainder of albuminous substances and other impurities, concentrating the solution until crystallization commences, and finally extracting the refined sugar, in the order named.

In testimony that we claim the foregoing as our invention, we have signed our names in presence of two subscribing witnesses.

JOHN ANDERS REINHOLD NILSSON.
SVEN ADOLF HELLQVIST.

Witnesses:
TASTEN NOTHIN,
C. NORDENDAHL.